(12) United States Patent
Han et al.

(10) Patent No.: US 6,326,100 B1
(45) Date of Patent: Dec. 4, 2001

(54) CYLINDRICAL SECONDARY BATTERY

(75) Inventors: Se-jong Han; Yun-seok Choi, both of Cheonan (KR)

(73) Assignee: Samsung SDI Co., Ltd., Suwon (KR)

(*) Notice: Subject to any disclaimer, the term of this patent is extended or adjusted under 35 U.S.C. 154(b) by 0 days.

(21) Appl. No.: 09/549,951

(22) Filed: Apr. 14, 2000

(30) Foreign Application Priority Data

Apr. 16, 1999 (KR) .................................................. 99-13496

(51) Int. Cl.$^7$ .................................................. H01M 10/52
(52) U.S. Cl. .................................. 429/57; 429/71; 429/89
(58) Field of Search .................................... 429/57, 71, 89

(56) References Cited

U.S. PATENT DOCUMENTS

| | | | |
|---|---|---|---|
| 5,407,760 | * 4/1995 | Kasner et al. | 429/89 X |
| 6,051,332 | * 4/2000 | Verhoog et al. | 429/57 X |
| 6,255,013 | * 7/2001 | Marukawa et al. | 429/89 X |

* cited by examiner

*Primary Examiner*—John S. Maples
(74) *Attorney, Agent, or Firm*—Leydig, Voit & Mayer, Ltd.

(57) ABSTRACT

A cylindrical secondary battery includes a case, a cathode plate and an anode plate installed in the case, and a separator interposed therebetween, a cap on the case and a cap cover coupled to the cap and having a vent hole, and a one-way valve installed in the vent hole. The one-way valve includes a hollow body portion inserted in the vent hole of the cap cover, gas passing grooves at the outer circumferential surface of the hollow body, an upper flange at the outer circumferential surface of the hollow body, disposed above the cap cover, a lower flange at the outer circumferential surface of the hollow body, disposed under the cap cover, a spring elastically supported between the upper flange and the cap cover, and a fragile portion closing an upper portion of the hollow body. Thus, gas generated during initial charging of the battery can be exhausted by a user through the one-way valve and the one-way valve can also be used as a device for preventing explosion due to the gas generated while using the battery.

3 Claims, 5 Drawing Sheets

CYLINDRICAL SECONDARY BATTERY

BACKGROUND OF THE INVENTION

1. Field of the Invention

The present invention relates to a cylindrical secondary battery, and more particularly, to a cylindrical secondary battery having a one-way valve in a cap assembly to exhaust gas generated during charging the battery.

2. Description of the Related Art

Batteries are electrical products for supplying a DC voltage. There are various types of batteries used for various electrical or electronic products and devices and rechargeable batteries used for vehicles and as emergency power for mechanical apparatuses. Batteries which are not rechargeable are generally referred to as primary batteries while ones capable of discharge and recharge by being provided with electricity from other electric powers are referred to as secondary batteries.

FIG. 1 is a sectional view showing the structure of a typical cylindrical secondary battery, Referring to the drawing a conventional secondary battery 10 includes a case 14 of a cylindrical can shape and an anode plate 16 and a cathode plate 17 installed in the case 14. The anode plate 16 and the cathode plate 17 are formed in strips having predetermined widths and lengths. A separator 18 is interposed between the anode plate 16 and the cathode plate 17 to prevent the anode plate 16 and the cathode plate 17 from contacting each other. In such a state, the anode plate 16 and the cathode plate 17 are rolled forming a jelly-roll.

Thus, the anode plate 16 and the cathode plate 17, which are rolled with interposition of the separator 18, alternate. Upper and lower ring members 15a and 15b supporting an insulation member 18 are installed at the upper end and the lower end of a jelly-roll of the anode plate 16 and the cathode plate 17, respectively.

A gasket 13 is arranged above the upper ring member 15a and a cap cover 12 and a cap 11 supported by the gasket 13 are provided. A fragile portion 19 is formed at the central position of the cap cover 13a. The fragile portion 19 is integrally formed with the cap cover 12 and, when the pressure inside the case 14 increases, the fragile portion 19 is broken to exhaust gas.

FIG. 2 is an exploded perspective view showing a cap assembly of the battery shown in FIG. 1. Referring to the drawing, the fragile portion 19 is located at the central portion of the cap cover 12 as described above and a bending portion 12a, which is bent during assembly, is formed at the edge of the cap cover 11. The fragile portion 19 is formed by forming a notch or a thin portion at the central portion of the cap cover 12 to partially decrease breaking strength. Thus, when the pressure in the case 14 increases, the fragile portion 19 is broken so that gas can be exhausted.

The process of manufacturing a battery having the above structure includes steps of inserting the anode plate 16 and the cathode plate 17 in the case 14, injecting electrolyte, and arranging a cap assembly including the cap 11 above the case 14. In performing a sealing process with respect to the cap assembly, a cathode tap at the cathode plate 17 is welded at a predetermined position of the cap assembly so that a stable electrical connection to the cathode plate 17 is maintained. Contrarily, as the anode plate 16 directly contacts the inner surface of the case 14, an electrical connection is achieved.

A charge process is performed before completed batteries are shipped as products. That is, secondary batteries are charged to a degree before they are shipped as products. Typically, it is known that gas is generated most in a secondary battery when the initial charge is performed. As gases generated during the initial charge, there are hydrogen carbon monoxide, carbon dioxide and hydrocarbons. As other gases are generated in addition to the above, there is a possibility of explosion. However, there has not been a method for effectively exhausting the generated gas. That is, although gas can be exhausted to the outside by forming the fragile portion 19 at the cap cover 12 and breaking the fragile portion 19 when the gas pressure increases over a predetermined value of pressure, if the fragile portion 19 is broken, the cap assembly cannot be used again.

SUMMARY OF THE INVENTION

To solve the above problem, it is an objective of the present invention to provide a cylindrical secondary battery having a valve for arbitrarily exhausting gas generated inside a case of the second battery.

Accordingly, to achieve the above objective, there is provided a cylindrical secondary battery comprising a case, a cathode plate and an anode plate alternately installed in the case and a separator interposed therebetween, a cap disposed above the case and a cap cover coupled to the cap and having a vent hole formed therein, and a one-way valve installed at the vent hole. The one-way valve comprises a hollow body portion which can be inserted in the vent hole of the cap cover, a plurality of gas passing grooves formed at the outer circumferential surface of the hollow body portion, an upper flange formed at the outer circumferential surface of the hollow body portion to be disposed above the cap cover, a lower flange formed at the outer circumferential surface of the hollow body portion to be disposed under the cap cover, a spring elastically supported between the upper flange and the cap cover, and a fragile portion closing the upper portion of the hollow body portion.

It is preferred in the present invention that, when an external force is not applied to the one-way valve, an upper surface of the lower flange closely contacts the bottom surface of the cap cover, forming a seal, and when an external force is applied to the one-way valve, the gas passing grooves arrive at the position corresponding to the vent hole so that gas in the case can be exhausted.

Also, it is preferred in the present invention that the fragile portion is broken when the pressure in the case is over a predetermined value so that gas in the case can be exhausted.

BRIEF DESCRIPTION OF THE DRAWINGS

The above objective and advantages of the present invention will become more apparent by describing in detail a preferred embodiment thereof with reference to the attached drawings in which.

DETAILED DESCRIPTION OF THE INVENTION

Figure 1:
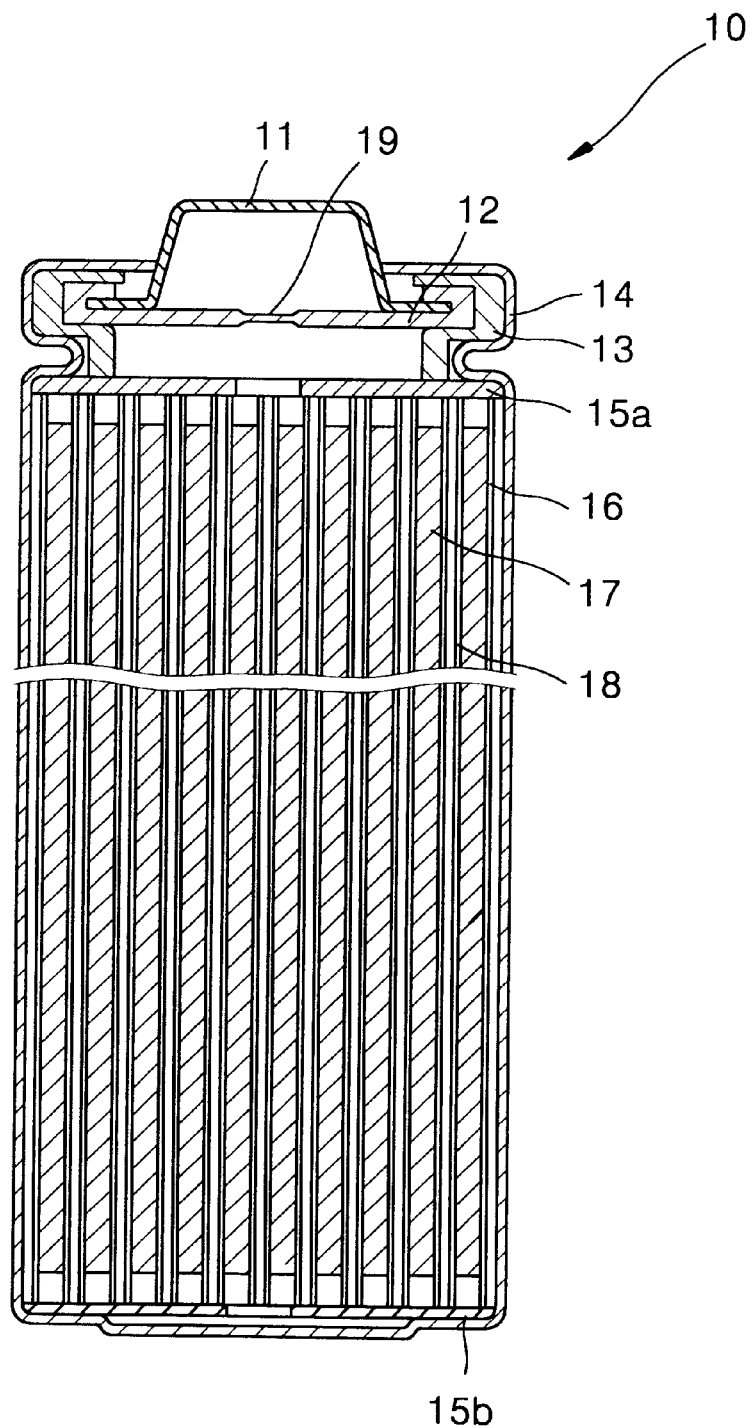
FIG. 1 is a sectional view showing the structure of a conventional cylindrical secondary battery.
Figure 3:
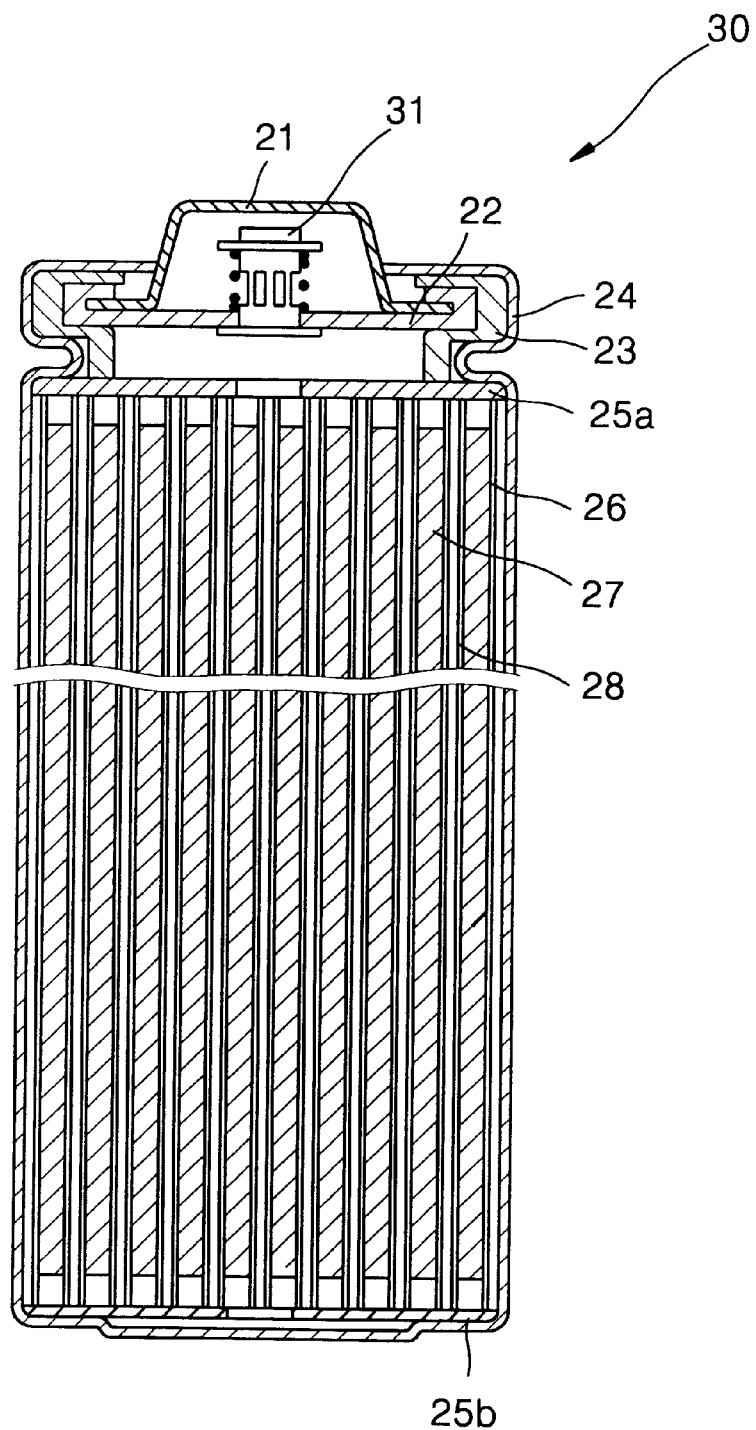
FIG. 3 is a sectional view showing the structure of a cylindrical secondary battery according to the present invention.

FIG. 3 shows a cylindrical secondary battery according to the present invention. The structures of major parts are substantially similar to those of the secondary battery shown in FIG. 1. Referring to the drawing, a cathode plate 28 and an anode plate 26 formed in strips are alternately installed in a cylindrical case 24 and a separator 27 is interposed between the cathode plate 28 and the anode plate 26. The upper and lower ends of the cathode plate 28 and the anode plate 26 are supported by rings 25a and 25b, respectively. A cap cover 22 and a cap 21 supported by a gasket 23 are provided at the upper portions of the electrode plates of the battery. A vent hole (22b of FIG. 4) is formed at the central portion of the cap cover 22 and a one-way valve 31 according to the present invention is installed at the vent hole. Also, although not shown in the drawing, a PTC (positive temperature coefficient) device can be arranged between the cap cover 22 and the cap 21.

Figure 4:
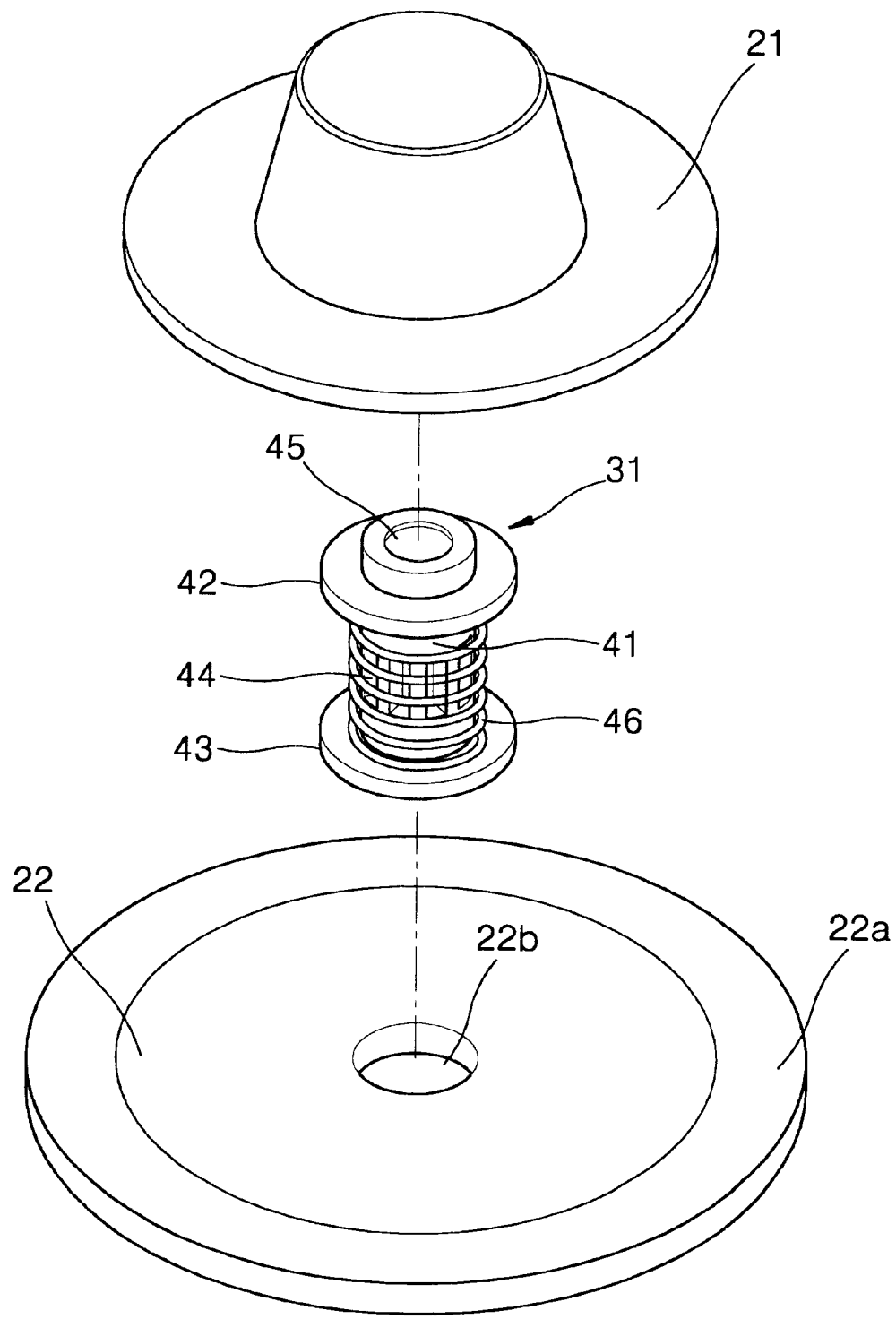
FIG. 4 is an exploded perspective view showing a cap assembly of the cylindrical secondary battery shown in FIG. 3.

FIG. 4 shows a part of the secondary battery shown in FIG. 3. Here, an installation state of the one-way valve 31 according to the present invention is shown. Referring to the drawing, the vent hole 22b is located at the center of the cap cover 22 and a bending portion 22a is located at the edge of the cap cover 22. The cap 21 is fixed to the upper portion of the cap cover 22 as the bending portion 22a is bent. The one-way valve 31 is installed at the vent hole 22b of the cap cover 22.

The one-way valve 31 has a hollow body portion 41 of which the bottom surface is open and the upper surface is closed. A plurality of gas passing grooves 44 are located at the outer circumferential surface of the hollow body portion 41. The hollow body portion 41 has an upper flange 42 and a lower flange 43. The maximum diameter of the hollow body portion 41 of the one-way valve 31 is congruous with the diameter of the vent hole 22b When the hollow body portion 41 inserted into the vent hole 22b, the lower flange 43 is disposed below the lower surface of the cap cover 22 and the upper flange 42 is disposed above the upper surface of the cap cover 22. The spring 46 is outside the hollow body portion 41. The upper end portion of the spring 46 is supported on the lower surface of the upper flange 42 and the lower end portion of the spring 46 is supported on the upper surface of the cap cover 22.

The gas passing grooves 44 extend lengthwise and are parallel to each other at the outer circumferential surface of the hollow body portion 41. When the middle portion of the gas passing grooves 44 corresponds to the position of the vent hole 22b, a predetermined space is formed between the inner diametric surface of the vent hole 22b and the gas passing grooves 44 so that gas can be exhausted through the space. A fragile portion 45 is located at the closed upper surface of the hollow body portion 41. The fragile portion 45 closes the upper portion of the hollow body portion 41 and includes, for example, a notch (not shown) at the edge of the upper surface thereof so that when pressure in the battery is over the predetermined value, the fragile portion 45 is broken.

Figure 2:
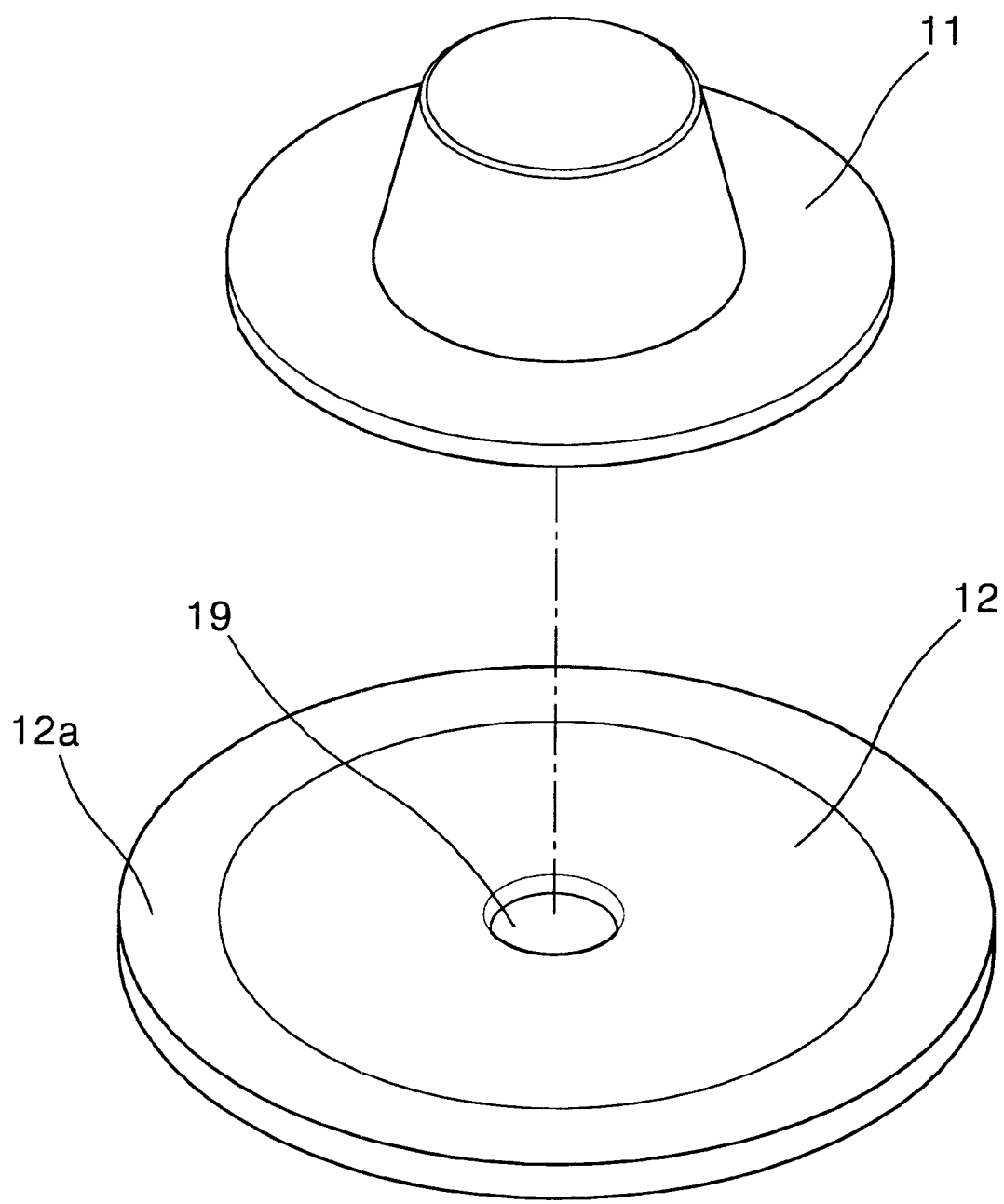
FIG. 2 is a perspective view of a cap assembly of the cylindrical secondary battery shown in FIG. 1.
Figure 5A:
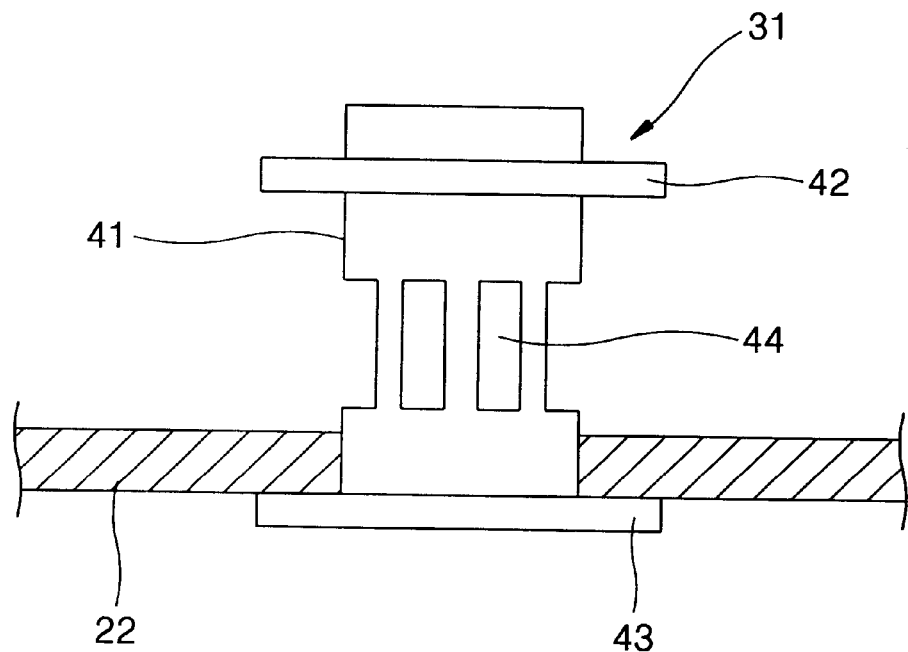
FIGS. 5A and 5B are views showing the operation of a one-way valve.
Figure 5B:
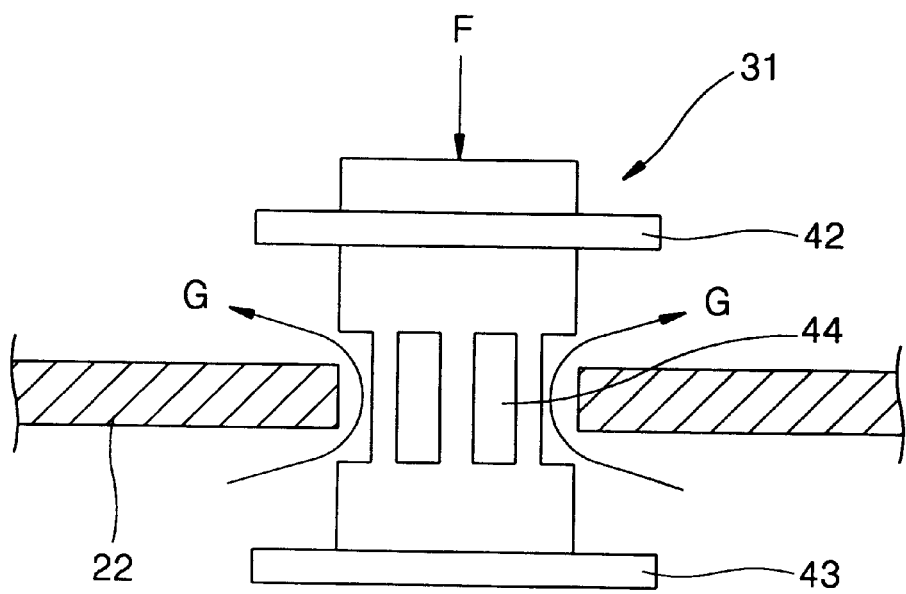

FIGS. 5A and 5B show the operation of the one-way valve. Here, the spring 46 is omitted for the convenience of explanation. Referring to FIG. 5A, an elastic force of the spring 46 (see FIG. 4) biases the one-way valve 31 upward. Thus, when no external force is applied, the lower flange 43 contacts the bottom surface of the cap cover 22. In this state the gas generated in the case 24 (see FIG. 2) cannot be exhausted to the outside.

Contrarily, referring to FIG. 5B, when an external force F is applied against the elastic force of the spring 46, the one-way valve 42 descends downward. Here, as the gas passing hole 44 arrives at the position corresponding to the inner diametric surface of the vent hole 22b of the cap cover 22, a space is formed therebetween so that gas can be exhausted as indicated by arrow G. When the external force F is removed, the one-way valve 31 returns to the original position, as shown in FIG. 5A.

Actually, the operation of the one-way valve 31 is further useful for manufacturing batteries. That is, the one-way valve 31 can be used to exhaust the gas generated in the case 24 to the outside before the cap 21 is fixed by bending the bending portion 22a of the cap cover 22. As mentioned above, as the gas is most generated in the case 24 during the initial charge, charge is first performed before the cap 21 is assembled and then the generated gas is exhausted by pressing the one-way valve 31. After the gas is exhausted, the cap 21 is fixed in a typical manner and the case 24 is fixed.

As the upper and lower portions of the hollow body portion of the one-way valve 31 are closed and opened, respectively, and the fragile portion 45 is located at the upper surface of the closed upper portion thereof, when the gas generated inside the case 24 after the cap 21 is completely assembled exceeds a predetermined pressure, the fragile portion 45 is broken so that the gas can be exhausted. That is, a manufacturer can arbitrarily use the one-way valve 31 to exhaust gas and also the one-way valve 31 has a function of preventing explosion of the battery due to gas generated while using the battery.

As described above, in the cylindrical secondary battery according to the present invention, by using the one-way valve, the gas generated during the initial charge can be arbitrarily exhausted by a user and also the one-way valve can be used as a device for preventing explosion due to the gas generated while using the battery. Thus, the problems in using and manufacturing batteries due to the gas generated in the batteries can be solved.

It is noted that the present invention is not limited to the preferred embodiment described above, and it is apparent that variations and modifications by those skilled in the art can be effected within the spirit and scope of the present invention defined in the appended claims.

What is claimed is:

1. A cylindrical secondary battery comprising:

a case;

a cathode plate and an anode plate installed in the case and a separator interposed between the cathode and anode plates;

a cap disposed on the case and a cap cover coupled to the cap and having a vent hole; and a one-way valve installed in the vent hole, wherein the one-way valve comprises:

a hollow body inserted in the vent hole of the cap cover;

a plurality of gas passing grooves at an outer circumferential surface of the hollow body;

a first flange at the outer circumferential surface of the hollow body disposed on a side of the cap cover opposite the cathode and anode plates;

a second flange at the outer circumferential surface of the hollow body disposed between the cap cover and the cathode and anode plates;

a spring elastically supported between the first flange and the cap cover; and a fragile portion closing a portion of the hollow body approximate the first flange.

2. The battery as claimed in claim 1, wherein, when an external force compressing the spring is not applied to the one-way valve, a first surface of the second flange contacts the cap cover, forming a seal, and when an external force is applied to the one-way valve, compressing the spring, the gas passing grooves move into the vent hole so that gas in the case is exhausted.

3. The battery as claimed in claim 1, wherein the fragile portion is broken when pressure in the case exceeds a threshold pressure so that gas in the case is exhausted.

* * * * *